United States Patent [19]

Kempermann et al.

[11] 4,003,843
[45] Jan. 18, 1977

[54] VULCANIZATION SYSTEMS FOR RUBBER MIXTURES WITH LIGHT FILLERS

[75] Inventors: Theo Kempermann, Cologne; Günter Marwede, Leverkusen, both of Germany

[73] Assignee: Bayer Aktiengesellschaft, Germany

[22] Filed: June 17, 1975

[21] Appl. No.: 587,415

[30] Foreign Application Priority Data

June 21, 1974 Germany ................. 2429818

[52] U.S. Cl. ............... 252/182; 260/79.5 B; 260/779 M; 260/785; 260/793; 260/797
[51] Int. Cl.$^2$ ............... C08K 9/06; C08K 5/54; C08K 5/47; C08K 5/40
[58] Field of Search ............... 252/182; 260/79.5 B, 260/779 R, 779 M, 785, 789, 793, 797

[56] References Cited

UNITED STATES PATENTS

| 2,640,088 | 5/1953 | Glenn | 260/779 M |
|---|---|---|---|
| 2,716,635 | 8/1955 | Davis | 260/779 M |
| 3,400,106 | 9/1968 | Morita | 260/779 M |
| 3,563,962 | 2/1971 | Mirviss | 260/779 M |

*Primary Examiner*—Benjamin R. Padgett
*Assistant Examiner*—Irwin Gluck
*Attorney, Agent, or Firm*—Connolly and Hutz

[57] ABSTRACT

A vulcanization system for natural and/or synthetic rubber containing light fillers comprising certain silanes, thiazoles, guanidines, and thiurams. By using this system the extremely unpleasant odor of silanes when used alone can be substantially diminished without affecting the properties of the vulcanizate.

4 Claims, No Drawings

VULCANIZATION SYSTEMS FOR RUBBER MIXTURES WITH LIGHT FILLERS

It is known that the mechanical properties of rubber vulcanisates containing light fillers are poorer than those of rubber vulcanisates produced with carbon black. In particular, the degree of crosslinking (modulus), tensile strength, tear resistance and abrasion resistance are unsatisfactory. In addition, unvulcanized rubber mixtures containing large quantities of light active fillers are frequently stiff and extremely difficult to process.

These disadvantages can be obviated by adding to the vulcanisation accelerator silanes corresponding to the formulae (I) or (II):

$$(R_1O)_3SiR_2 \quad \text{(I)}$$

$$(R_1O)_3SiR_3Si(OR_1)_3 \quad \text{(II)}$$

In the formulae (I) and (II), $R_1$ represents a hydrocarbon radical, $R_2$ represents a monovalent sulphur-containing hydrocarbon radical and $R_3$ represents a divalent sulphur-containing hydrocarbon radical. Used in quantities of, for example, from 0.1 to 6.0 parts by weight per 100 parts by weight of rubber, these silanes considerably improve the properties of the vulcanisate. Their effect is greater, the larger the quantity of filler (based on rubber). The modulus and the strength of the vulcanisates are particularly improved. Rubber mixtures containing more than 100 parts by weight of light, active filler per 100 parts by weight of rubber can only be vulcanised in the presence of the silanes. Without the silanes, only soft inelastic products are obtained.

Silanes corresponding to the formulae (I) and (II) above have an extremely unpleasant odour. They have to be used in relatively large quantities. Accordingly, it is desirable to obtain the same advantages with smaller quantities of silane.

The present invention relates to an accelerator mixture for the sulphur vulcanisation of rubbers consisting of:

a. 0.1 to 4.0 parts by weight of a silane of the formula $(R_1O)_3SiR_2$ or $(R_1O)_3SiR_3Si(OR_1)_3$, in which $R_1$ is a hydrocarbon radical, $R_2$ is a monovalent sulphur-containing hydrocarbon radical and $R_3$ is a divalent sulphur-containing hydrocarbon radical;
b. 1.0 to 4.0 parts by weight of a thiazole accelerator;
c. 1.0 to 4.0 parts by weight of a guanidine accelerator; and
d. 0.1 to 1.0 part by weight of a thiuram accelerator.

In particular, $R_1$ is an alkyl radical with from 1 to 6 carbon atoms, $R_2$ is a radical of the formula $-CH_2-(CH_2)_n SH$ ($n = 0 - 5$) and $R_3$ is a radical of the formula $-CH_2-CH_2-(CH_2)_n S_x (CH_2)_n CH_2-$ ($n = 0 - 5, x = 1 - 6$).

This accelerator mixture is used in quantities of from 2 to 15 parts by weight per 100 parts by weight of rubber in the vulcanisation by known methods of a rubber containing light fillers, conventional vulcanisation agents such as sulphur, zinc oxide and stearic acid, in the usual quantities. Sulphur in particular should be present in the usual quantities of from 1 to 6 phr. Suitable fillers are light, active, semi-active and inactive fillers, such as precipitated silica, hard kaolin, soft kaolin, chalk and siliceous chalk, etc.

The filler is best used in quantities of, for example, from 20 to 200 parts by weight per 100 parts by weight of rubber.

Suitable rubbers are, for example, natural rubber or synthetic, rubber-like polymers of the type obtained, for example, from conjugated diolefins, such as butadiene, chlorobutadiene, dimethyl butadiene, isoprene and its homologues; or copolymers of these conjugated diolefins with polymerisable vinyl compounds, such as styrene, α-methyl styrene, acrylonitrile, methacrylonitrile or acrylates; and also polymers such as ethylene-vinyl acetate copolymers, ethylene-propylene terpolymers, for example with dienes as the ter component, ethylene-propylene copolymers, polyurethanes and mixtures of the above-mentioned polymers.

Accordingly, the invention also relates to a process for the vulcanisation of a rubber containing light fillers with sulphur, zinc oxide, stearic acid and, optionally, the usual additives, which is distinguished by the fact that vulcanisation is accelerated with a mixture of:

a. 0.1 to 4.0 parts by weight of a silane of the formula $(R_1O)_3SiR_2$ or $(R_1O)_3SiR_3Si(OR_1)_3$, in which $R_1$ is a hydrocarbon radical, $R_2$ is a monovalent sulphur-containing hydrocarbon radical and $R_3$ is a divalent sulphur-containing hydrocarbon radical;
b. 1.0 to 4.0 parts by weight of a thiazole accelerator;
c. 1.0 to 4.0 parts by weight of a guanidine accelerator; and
d. 0.1 to 1.0 parts by weight of a thiuram accelerator, in quantities of from 2 to 15 parts by weight per 100 parts by weight of rubber.

Particularly suitable silanes correspond to the formulae (III) and (IV):

$$(C_2H_5O)_3SiCH_2CH_2CH_2SSSSCH_2CH_2CH_2Si(OC_2H_5)_3 \quad \text{(III)}$$

$$(CH_3O)_3SiCH_2CH_2CH_2SH \quad \text{(IV)}$$

Particularly suitable thiazole accelerators (b) are mercaptobenzothiazole, zinc mercaptobenzothiazole, dibenzothiazyl disulphide, N-cyclohexyl sulphenamido-2-benzthiazole, N-tert.-butyl sulphenamido-2-benzthiazole and N-morpholino-thio-2-benzthiazole.

Particularly suitable guanidine accelerators (c) are diphenyl guanidine, di-o-tolyl guanidine and o-tolyl biguanide.

Particularly suitable thiuram accelerators (d) are tetramethyl thiuram monosulphide, tetramethyl thiuram disulphide, tetraethyl thiuram disulphide, dimethyl diphenyl thiuram disulphide and bis-pentamethylene thiuram tetrasulphide.

The accelerator mixture according to the invention and the process according to the invention use only a minimal quantity of silane. In cases where, in addition to a small quantity of silane, all three accelerators are simultaneously present, excellent results are obtained.

The quantity of silane can be reduced to between one half and one quarter by comparison with mixtures containing only one accelerator. As a result, the silane odour is considerably reduced, whilst the mechanical properties of the vulcanisates are actually improved. In addition, the total quantity of accelerator mixture required is smaller.

To carry out the process, the silane and accelerator mixture, together with sulphur, zinc oxide, stearic acid and, optionally, other additives, may be worked into the rubber containing light fillers in known manner and the rubber mixture vulcanised in the usual way.

EXAMPLE 1

The following mixtures are prepared in an internal mixer:

| Mixture No. | Parts by weight | | |
|---|---|---|---|
| | 1 | 2 | 3 |
| Solution polybutadiene (Ti-catalyst) | 70.0 | 70.0 | 70.0 |
| Non-discolouring butadiene-styrene rubber (emulsion rubber) | 30.0 | 30.0 | 30.0 |
| Precipitated, highly active silica | 60.0 | 60.0 | 60.0 |
| Kaolin | 140.0 | 140.0 | 140.0 |
| Naphthenic mineral oil plasticiser | 40.0 | 40.0 | 40.0 |
| Zinc oxide | 7.0 | 7.0 | 7.0 |
| Stearic acid | 2.0 | 2.0 | 2.0 |
| Coumarone resin | 6.0 | 6.0 | 6.0 |
| Iron oxide red | 0.5 | 0.5 | 0.5 |
| Iron hydroxide yellow | 5.0 | 5.0 | 5.0 |
| Phenolic antiager | 2.0 | 2.0 | 2.0 |
| Silane (III) | 5.0 | 2.5 | 2.5 |
| Dibenzothiazyl disulphide | 2.5 | 2.0 | 2.0 |
| Diphenyl guanidine | 2.0 | 2.0 | — |
| Tetramethyl thiuram monosulphide | — | 0.5 | 0.5 |
| Sulphur | 3.0 | 3.0 | 3.0 |

4 mm test specimens produced from these mixtures were vulcanised under the conditions indicated below and were then subjected to the following tests: Tensile strength in (MPa) according to DIN 53 504 Elongation at break in (%) according to DIN 53 504 modulus in (MPa) according to DIN 53 504 Shore-A-hardness (Shore) according to DIN 53 505 rebound elasticity in (%) according to DIN 53 512 Tear propagation resistance in (N) according to Pohle The results set out in Table 1 were obtained.

Table 1

| Vulcanisate No. | | 1 | 2 | 3 |
|---|---|---|---|---|
| Press vulcanisation at 150° C | Minutes | | | |
| Tensile strength | 10' | 10.2 | 9.3 | 2.3 |
| | 20' | 10.7 | 9.9 | 3.0 |
| | 30' | 10.5 | 11.2 | 3.2 |
| | 45' | 10.2 | 10.2 | 3.4 |
| | 60' | 10.5 | 10.1 | 3.4 |
| Elongation at break | 10' | 250 | 205 | 20 |
| | 20' | 195 | 205 | 25 |
| | 30' | 165 | 235 | 15 |
| | 45' | 140 | 190 | 20 |
| | 60' | 170 | 220 | 20 |
| Shore hardness at 23° C | 10' | 81 | 85 | 80 |
| | 20' | 83 | 85 | 83 |
| | 30' | 84 | 86 | 85 |
| | 45' | 86 | 87 | 87 |
| | 60' | 86 | 88 | 88 |
| Tear propagation resistance | 10' | 130 | 161 | 10 |
| | 20' | 124 | 149 | 10 |
| | 30' | 135 | 145 | 10 |
| | 45' | 170 | 150 | 10 |

Where the accelerator combination according to the invention (mixture 2) is used, half the silane is saved in relation to the comparison test (mixture 1). The total quantity of products belonging to the accelerator system drops from 95 parts by weight to 7.0 parts by weight. The mechanical properties of the vulcanisates, in particular Shore-hardness, are improved. If one component of the system is left out (mixture 3, no quanidine), poor mechanical properties, especially minimal strength, are obtained.

EXAMPLE 2

The following mixtures are prepared in an internal mixer:

| Mixture No. | | Parts by weight | | | | | |
|---|---|---|---|---|---|---|---|
| | | 4 | 5 | 6 | 7 | 8 | 9 |
| Natural rubber RSS 1 | basic recipe | 30.0 | 30.0 | 30.0 | 30.0 | 30.0 | 30.0 |
| Solution polybutadiene (Ti-catalyst) | | 70.0 | 70.0 | 70.0 | 70.0 | 70.0 | 70.0 |
| Precipitated highly active silica | | 80.0 | 80.0 | 80.0 | 70.0 | 80.0 | 80.0 |
| Naphthenic mineral oil plasticiser | | 60.0 | 60.0 | 60.0 | 60.0 | 60.0 | 60.0 |
| Zinc oxide | | 5.0 | 5.0 | 5.0 | 5.0 | 5.0 | 5.0 |
| Anti-ozonant wax | | 2.0 | 2.0 | 2.0 | 2.0 | 2.0 | 2.0 |
| Phenolic antioxidant | | 1.0 | 1.0 | 1.0 | 1.0 | 1.0 | 1.0 |
| Non-discolouring anti-ozonant | | 2.0 | 2.0 | 2.0 | 2.0 | 2.0 | 2.0 |
| Stearic acid | | 2.0 | 2.0 | 2.0 | 2.0 | 2.0 | 2.0 |
| Silane (III) | | 4.0 | 2.0 | 1.0 | 1.0 | — | — |
| Dibenzothiazyl disulphide | | 2.0 | 2.0 | 2.0 | 2.0 | 2.0 | 2.0 |
| Diphenyl guanidine | | 2.0 | 2.0 | 2.0 | 2.0 | 2.0 | 2.0 |
| Tetramethyl thiuram di-sulphide | | — | — | — | 0.5 | — | 1.0 |
| Tetramethyl thiuram mono-sulphide | | — | — | 0.5 | — | 1.0 | — |
| Sulphur | | 3.0 | 3.0 | 3.0 | 3.0 | 3.0 | 3.0 |

4 mm test specimens produced from these mixtures were vulcanised under the conditions indicated below and were then subjected to the same tests as described in Example 1.

The results obtained are set out in Table 2.

Table 2

| Vulcanisate No. | 4 | 5 | 6 | 7 | 8 | 9 |
|---|---|---|---|---|---|---|

Press vulcanisation at 150° C
Minutes

Table 2-continued

| Vulcanisate No. | | 4 | 5 | 6 | 7 | 8 | 9 |
|---|---|---|---|---|---|---|---|
| Tensile strength | 10' | 13.8 | 11.0 | 11.9 | 12.4 | 10.2 | 9.7 |
| | 20' | 12.7 | 12.3 | 12.1 | 12.5 | 10.7 | 9.3 |
| | 30' | 12.2 | 11.5 | 12.3 | 12.3 | 10.3 | 9.4 |
| | 45' | 12.2 | 11.7 | 11.9 | 12.4 | 10.1 | 9.6 |
| | 90' | 11.5 | 10.5 | 11.3 | 11.2 | 9.9 | 9.5 |
| Elongation at break | 10' | 725 | 800 | 625 | 605 | 770 | 740 |
| | 20' | 660 | 775 | 635 | 630 | 790 | 740 |
| | 30' | 635 | 715 | 650 | 635 | 815 | 790 |
| | 45' | 640 | 710 | 645 | 645 | 845 | 810 |
| | 90' | 660 | 675 | 670 | 650 | 925 | 915 |
| modulus at 300 % elongation | 10' | 4.2 | 2.7 | 4.7 | 5.0 | 2.7 | 2.8 |
| | 20' | 4.2 | 3.1 | 4.6 | 4.7 | 2.7 | 2.7 |
| | 30' | 4.3 | 3.3 | 4.3 | 4.6 | 2.5 | 2.5 |
| | 45' | 4.1 | 3.4 | 4.2 | 4.4 | 2.4 | 2.4 |
| | 90' | 3.8 | 3.2 | 3.8 | 3.9 | 2.1 | 2.0 |
| rebound elasticity | 10' | 49 | 46 | 51 | 52 | 48 | 50 |
| | 20' | 49 | 48 | 50 | 52 | 49 | 49 |
| | 30' | 49 | 47 | 50 | 52 | 49 | 49 |
| | 45' | 48 | 46 | 49 | 50 | 49 | 48 |
| | 90' | 46 | 48 | 46 | 48 | 49 | 47 |
| Tear propagation resistance | 10' | 295 | 245 | 290 | 260 | 205 | 175 |
| | 20' | 280 | 280 | 270 | 270 | 205 | 175 |
| | 30' | 265 | 260 | 255 | 250 | 200 | 170 |
| | 45' | 255 | 255 | 240 | 250 | — | 160 |

The accelerator mixtures according to the invention (mixtures 6 and 7) give much higher degrees of crosslinking than the accelerators which do not correspond to the invention (mixtures 5, 8 and 9). In addition, mixtures 6 and 7 save half the silane by comparison with mixture 5.

In regard to its degree of crosslinking, combination 6 according to the invention is substantially equal to combination 4 which does not correspond to the invention. However, combination 4 contains 4 times the quantity of silane, the total quantity of accelerator amounting to 8.0 parts by weight, whereas it only amounts to 5.5 parts by weight in combination 6. Apart from inadequate crosslinking, mixtures 8 and 9 (which do not correspond to the invention) also show poor strength values.

EXAMPLE 3

The following mixtures are prepared in an internal mixer;

| Mixture No. | Parts by weight | | | |
|---|---|---|---|---|
| | 10 | 11 | 12 | 13 |
| Basic recipe, cf. Example 2 | | | | |
| Silane (IV) | 1.0 | 1.0 | 1.0 | 1.0 |
| Dibenzothiazyl disulphide | 2.0 | — | 4.0 | — |
| Diphenyl guanidine | 2.0 | 4.0 | — | — |
| Tetramethyl thiuram monosulphide | 0.5 | 0.5 | 0.5 | 0.5 |
| Sulphur | 3.0 | 3.0 | 3.0 | 3.0 |

4 mm test specimens prepared from these three mixtures are vulcanised under the conditions indicated below and then tested in the same way as described in Example 1.

The results obtained are set out in Table 3.

Table 3

| Vulcanisate No. | | 10 | 11 | 12 | 13 |
|---|---|---|---|---|---|
| Press vulcanisation at 150° C | | | | | |
| | Minutes | | | | |
| Tensile strength | 10' | 13.5 | 13.1 | 5.4 | 2.0 |
| | 20' | 13.0 | 13.2 | 7.0 | 2.2 |
| | 30' | 13.1 | 12.6 | 6.8 | 2.3 |
| | 45' | 13.1 | 12.5 | 7.2 | 3.0 |
| | 90' | 11.8 | 12.8 | 7.0 | 4.8 |
| Elongation at | 10' | 640 | 890 | 580 | 310 |
| break | 20' | 630 | 880 | 640 | 330 |
| | 30' | 630 | 840 | 610 | 370 |
| | 45' | 650 | 790 | 600 | 440 |
| | 90' | 660 | 740 | 570 | 520 |
| modulus at | 10' | 5.2 | 3.4 | 2.9 | 2.0 |
| 300 % elongation | 20' | 5.1 | 3.4 | 3.2 | 2.0 |
| | 30' | 5.1 | 3.6 | 3.4 | 2.2 |
| | 45' | 4.3 | 3.8 | 3.5 | 2.3 |
| | 90' | 4.3 | 3.8 | 3.6 | 2.9 |
| rebound elasticity | 10' | 49 | 47 | 43 | 42 |
| | 20' | 49 | 47 | 43 | 44 |
| 30' | | 47 | 47 | 41 | 42 |
| | 45' | 48 | 48 | 41 | 44 |
| | 90' | 47 | 49 | 44 | 48 |
| Tear propagation | 10' | 300 | 290 | 90 | 40 |
| resistance | 20' | 290 | 290 | 100 | 40 |
| | 30' | 320 | 280 | 120 | 40 |
| | 45' | 300 | 270 | 120 | 50 |
| | 90' | 250 | 240 | 110 | 80 |

The accelerator mixture according to the invention (mixture 10) gives the highest degree of crosslinking modulus and the best strength value. Mixture 11 does not correspond to the invention. The thiazole was left out and, instead, the quantity of guanidine increased. Accordingly, the total accelerator content is the same as in mixture 10. The degree of crosslinking is distinctly reduced, as reflected both in the strain value and in elongation at break. If the guanidine is left out and the quantity of thiazole increased accordingly, the properties become even poorer (mixture 12). The poorest properties are obtained when both thiazole and guanidine are left out (mixture 13).

EXAMPLE 4

If the test is carried out in the same way as in Example 2 with only the basic recipe changed towards greater hardness values (90 instead of 80 parts by weight of filler and 40 instead of 60 parts by weight of plasticiser), the modulus obtained are the same as in Example 2. The accelerator mixture according to the invention (similar to mixture 6) gives a modulus of 7.3 MPa (vulcanisation for 30 minutes at 150° C). The accelerators which do not correspond to the invention (similar to mixtures 5 and 8) produce a modulus only 5.9 MPa and 4.5 MPa, respectively.

What we claim is:

1. An accelerator mixture for the sulphur vulcanisation of rubbers comprising:

a. 0.1 to 4.0 parts by weight of a silane corresponding to the formula $(R_1O)_3SiR_2$ or $(R_1O)_3SiR_3Si(OR_1)_3$, in which $R_1$ represents a hydrocarbon radical, $R_2$ represents a monovalent sulphur-containing hydrocarbon radical and $R_3$ represents a divalent sulphur-containing hydrocarbon radical;

b. 1.0 to 4.0 parts by weight of a thiazole accelerator;

c. 1.0 to 4.0 parts by weight of a guanidine accelerator; and d. 0.1 to 1.0 part by weight of a thiuram accelerator.

2. An accelerator mixture of claim 1 wherein $R_1$ is alkyl having 1 to 6 carbon atoms, $R_2$ is of the formula
   -CH$_2$(CH$_2$)$_n$SH
and $R_3$ is of the formula
   -CH$_2$(CH$_2$)$_n$S$_x$(CH$_2$)$_n$CH$_2$-
wherein $n$ is 0 to 5 and $x$ is 1 to 6.

3. An accelerator mixture as claimed in claim 1 wherein the silane is of the formula
   $(C_2H_5O)_3SiCH_2CH_2CH_2SSSSCH_2CH_2CH_2Si(OC_2H_5)_3$ or $(CH_3O)_3SiCH_2CH_2CH_2SH$.

4. An accelerator mixture as claimed in claim 1, wherein the thiazole accelerator (b) is mercaptobenzothiazole, zinc mercaptobenzothiazole, dibenzothiazyl disulphide, N-cyclohexyl sulphenamido-2-benzthiazole, N-tert.-butyl sulphenamide-2-benzthiazole or N-morpholino-this-2-benzthiaole, wherein the guanidine accelerator (c) is diphenyl guanidine, di-o-tolyl guanidie or o-tolyl biguanide, and wherein the thiuram accelerator (d) is tetramethyl thiuram monosulphide, tetramethyl thiuram disulphide, tetraethyl thiuram disulphide, dimethyl diphenyl thiuram disulphide or bis-pentamethylene thiuram tetrasulphide.

* * * * *